(12) United States Patent
Hippauf et al.

(10) Patent No.: US 12,100,858 B2
(45) Date of Patent: Sep. 24, 2024

(54) METHOD FOR PRODUCING A SOLID ELECTROLYTE MEMBRANE OR AN ANODE, AND SOLID ELECTROLYTE MEMBRANE OR ANODE

(71) Applicants: Fraunhofer-Gesellschaft Zur Foerderung der Angewandten Forschung E.V., Munich (DE); Technische Universitaet Dresden, Dresden (DE)

(72) Inventors: Felix Hippauf, Dresden (DE); Benjamin Schumm, Dresden (DE); Sebastian Tschoecke, Dresden (DE); Holger Althues, Dresden (DE); Stefan Kaskel, Dresden (DE); Susanne Doerfler, Dresden (DE)

(73) Assignees: FRAUNHOFER-GESELLSCHAFT ZUR FOERDERUNG DER ANGEWANDTEN FORSCHUNG B.V., Munich (DE); TECHNISCHE UNIVERSITÄT DRESDEN, Dresden (DE)

( * ) Notice: Subject to any disclaimer, the term of this patent is extended or adjusted under 35 U.S.C. 154(b) by 598 days.

(21) Appl. No.: 17/413,985

(22) PCT Filed: Dec. 17, 2019

(86) PCT No.: PCT/EP2019/085594
§ 371 (c)(1),
(2) Date: Jun. 15, 2021

(87) PCT Pub. No.: WO2020/127223
PCT Pub. Date: Jun. 25, 2020

(65) Prior Publication Data
US 2022/0029242 A1  Jan. 27, 2022

(30) Foreign Application Priority Data

Dec. 18, 2018 (DE) ................. 10 2018 222 142.1

(51) Int. Cl.
*H01M 50/411* (2021.01)
*H01M 4/04* (2006.01)
(Continued)

(52) U.S. Cl.
CPC ....... *H01M 50/411* (2021.01); *H01M 4/0435* (2013.01); *H01M 4/623* (2013.01); *H01M 50/406* (2021.01)

(58) Field of Classification Search
CPC ............ H01M 50/411; H01M 50/406; H01M 4/0435; H01M 4/623
See application file for complete search history.

(56) References Cited

U.S. PATENT DOCUMENTS 4,320,184 A   3/1982 Bernstein et al.
5,238,759 A   8/1993 Plichta et al.
(Continued)

FOREIGN PATENT DOCUMENTS

CN   10 548 9931   4/2016
DE   11 2012 000 513   10/2013
(Continued)

OTHER PUBLICATIONS

Machine Translation of JP-2004513529-A (Dec. 20, 2023) (Year: 2023).*

(Continued)

*Primary Examiner* — Matthew J Merkling
(74) *Attorney, Agent, or Firm* — Jacobson Holman PLLC

(57) ABSTRACT

A method for producing a solid electrolyte membrane (3) or an anode unit for a solid-state battery, in which method a powder mixture consisting of a solid electrolyte material and (Continued)

polytetrafluoroethylene is produced for the solid electrolyte membrane (3) and a powder mixture consisting of an electrode material, a solid electrolyte material, an electrically conductive conduction additive and polytetrafluoroethylene is produced for the anode unit, at least partially fibrillated polytetrafluoroethylene is formed by applying shear forces to the powder mixture, and the powder mixture is shaped into a flexible composite layer. The powder mixture has at most 1 wt. % polytetrafluoroethylene.

13 Claims, 10 Drawing Sheets

(51) Int. Cl.
  *H01M 4/62* (2006.01)
  *H01M 50/406* (2021.01)

(56) References Cited

U.S. PATENT DOCUMENTS

| | | | | |
|---|---|---|---|---|
| 2011/0111295 | A1* | 5/2011 | Yamada | H01M 4/485 |
| | | | | 252/182.1 |
| 2012/0040243 | A1* | 2/2012 | Zhong | H01G 11/68 |
| | | | | 429/211 |
| 2015/0349377 | A1 | 12/2015 | Sugiura et al. | |
| 2016/0248120 | A1 | 8/2016 | Yamada et al. | |

FOREIGN PATENT DOCUMENTS

| | | | |
|---|---|---|---|
| DE | 11 2012 005 469 | | 9/2014 |
| DE | 10 2017 208 220 | | 11/2018 |
| EP | 1 644 136 | | 8/2018 |
| JP | 62-254367 A | † | 11/1987 |
| JP | S62-254367 | | 11/1987 |
| JP | 2004513529 A | * | 4/2004 |
| JP | 2012-164571 A | † | 8/2012 |
| JP | 2015018712 A | * | 1/2015 |
| JP | 2016-039006 | | 3/2016 |
| KR | 20170089333 A | * | 8/2017 |

OTHER PUBLICATIONS

Machine Translation of KR-20170089333-A (Dec. 20, 2023) (Year: 2023).*
Machine Translation of JP-2015018712-A (Apr. 29, 2024) (Year: 2024).*
International Search Report.
German Examination Report.
Ishida et al. Mechanical alloying of polymer/metal systems. Journal of Materials Science Letters, Chapman and Hall Ltd., vol. 12, No. 23,, Dec. 1, 1993, pp. 1851-1853.
Penghao et al. Study on $(100-x)(70Li_2S-30P_2S_5)-xLi_2ZrO_3$ glass ceramic electrolyte for all-solid-state lithium-ion batteries. Journal of Power Sources, vol. 356, May 2. 2017, pp. 163-171.
Japanese Office Action.
BTR BFC series product information, 2022, retrievable from https://www.btrchina.com/en/NegativeProducts/info.aspx?itemid=1065. The 2022 copyright date is printed on the last line of the document page in small font.†
Yamaguchi et al, Structural Analysis of the Sulfide Solid Electrolyte Glass Obtained by Different Production Methods, Spring-8/SACLA Research Report—J-Stage, Section B, Jan. 25, 2018, DOI:10.18957/rr.6.1.101, p. 101 and part of p. 102.†
TeflonTM PTFE 6CN X product information, 2016, retrievable from https://www.teflon.com/en/-/media/files/teflon/teflon-ptfe-6cn-x-product-info.pdf?rRev=973e0a379c144078851ecdb6968e3b63&hash=C8EE4CC32BAB6CD83B544C040E70F8C7#:~:text=Teflon%E2%84%A2%20PTFE%206CN%20X%20is%20designed%20for%processing%20at,%2C%20Grade%202%2C%20Class%20C.†

\* cited by examiner
† cited by third party

METHOD FOR PRODUCING A SOLID ELECTROLYTE MEMBRANE OR AN ANODE, AND SOLID ELECTROLYTE MEMBRANE OR ANODE

BACKGROUND OF THE INVENTION

The present invention relates to a method of producing a solid electrolyte membrane or an anode and to a correspondingly produced solid electrolyte membrane or anode.

Solid state batteries represent a very promising further development of lithium ion batteries. With solid state batteries, a lithium ion conductor present as a solid state body is used as the electrolyte instead of a liquid electrolyte system. It simultaneously serves as an ion conductor between active material particles and as an ion conductive separator between the anode and the cathode. What is important here is the possibility of a large area processing of powdery electrode mixtures and the formation of an intimate contact surface between the solid electrolyte and active materials having as many contact points as possible and as few hollow spaces as possible.

Solid state batteries can inter alia be categorized with reference to the electrolyte class used (oxide, sulfide, and polymer based). Oxide solid electrolytes have a high chemical and mechanical stability. A processing into non-porous and thin electrodes or solid electrolyte membranes, however, represents a great challenge due to the high sintering temperatures. Sulfide electrolyte materials can also hardly be deposited over large areas. Different binder solvent mixtures are used for the anode, cathode, and electrolyte layer for the application by means of wet chemical processes as described, for example, in US 2016/248120 A1 since otherwise on a layer application, a solvation of the layer therebelow can occur. The comparatively high binder content of several weight percent and higher electrical and ionic resistances resulting therefrom are disadvantageous in such processes.

SUMMARY OF THE INVENTION

It is therefore the underlying object of the present invention to develop components of a solid state battery at the anode side and to develop methods for their production that avoid said disadvantages, that is that can be produced with a large area and that have electrical and ionic resistances that are as low as possible.

This object is achieved in accordance with the invention by a method, membrane or anode unit as set forth in the claims.

A method of producing a solid electrolyte membrane for a solid state battery, preferably an alkali ion solid state battery or a lithium battery or a sodium battery, has a method step in which a powder mixture of a solid electrolyte material and polytetrafluoroethylene (PTFE) is produced. At least partially fibrillated polytetrafluoroethylene is formed by the action of shear forces on the powder mixture. The powder mixture is subsequently shaped into a flexible composite layer as the solid electrolyte membrane. The powder mixture has a maximum of 1 weight percent polytetrafluoroethylene.

A use of binding agent can be reduced by using fibrillated polytetrafluoroethylene as the binding agent so that only small amounts of a maximum of 1 weight percent polytetrafluoroethylene of the solid state electrolyte membrane are required, which is what makes a use of the polytetrafluoroethylene as the binder for these cell components possible at all and the electrical properties are therefore improved. The small binder content moreover makes possible the production and design of a solid electrolyte membrane and an anode unit as battery components that are typically exposed to an electrical voltage of less than 0.1 V with respect to lithium in which the degradation of the binder material PTFE otherwise produces unwanted side reactions. The small binder content reduces the mentioned side reactions, which makes a technically efficient production and design possible. The heart of the invention is the production of a solid electrolyte membrane or anode unit as battery components that are typically exposed to an electrochemical potential close to that of lithium or sodium, possibly even being in direct, that is directly touching, contact with these elements. It is possible to produce a freestanding and processable film despite the small binder content. The binder normally degrades below the specified potential, which results in an irreversible loss of capacity (anode) and functionality of the cell component (membrane). A mechanical stability of the electrodes is provided by an external bracing for solid state batteries after a cell assembly and a pressing. A binder function is therefore no longer required in the final cell, but is only of significance during the assembly.

A simple processing is ensured by a powder mixture, by which a material should be understood that is present in granulate form and is composed of a plurality of small particles having a size of up to 5 μm for the solid electrolyte membrane or up to 15 μm for active material particles or is a granular or fragmentary mix or bulk material. The powder mixture can be present in dry form to simplify the handling. In addition, the powder mixture can also not be pourable in the sense of the standard DIN EN ISO 6186. "Dry" should be understood within the framework of this document such that components of the powder mixture are present as solid state bodies free of liquids or materials present in a liquid aggregate state. The powder mixture can be solvent-free, that is compiled without solvent. A "flexible composite layer" should be understood as a composite layer that can be bent or folded and unfolded by up to 180° without breaking at room temperature. A bending radius is preferably 90 μm to 100 μm, particularly preferably 100 μm.

The formation of the at least partially fibrillated, but alternatively also completely fibrillated, polytetrafluoroethylene can take place by grinding, admixture in a worm shaft or in a calendar rolling device, kneading device, mortar device, or a combination of said methods to ensure an efficient fibrillation. The formation of the at least partially fibrillated polytetrafluoroethylene typically takes place at room temperature; however, to reach a binder content of less than 0.5 weight percent, the formation is preferably carried out at elevated temperatures of 60° C. to 100° C., particularly preferably at 90° C. to 100° C., in particular at 100° C.

The shaping of the powder mixture into the flexible composite layer typically takes place by rolling, pressing, or extrusion. However, a combination of said methods can also be used.

The polytetrafluoroethylene can be present in the composite layer at least partially as monoaxially and/or biaxially oriented polytetrafluoroethylene. The polytetrafluoroethylene can, however, also be present as completely monoaxially or completely biaxially oriented polytetrafluoroethylene.

Provision can be made that the powder mixture has the solid electrolyte material in a concentration of 99 weight percent to 99.9 weight percent and the polytetrafluoroethylene in a concentration of 0.1 weight percent to 1 weight percent. The powder mixture preferably has less than 0.5 weight percent polytetrafluoroethylene, particularly preferably between 0.1 weight percent and 0.4 weight percent.

A solid electrolyte membrane comprises a solid electrolyte material and polytetrafluoroethylene, with the solid electrolyte membrane comprising a maximum of 1 weight percent polytetrafluoroethylene.

The method described can be used to produce the described solid electrolyte membrane, i.e. the described solid electrolyte membrane can be produced by the described method.

A solid electrolyte electrode composite comprises a solid electrolyte membrane having the described properties that is applied directly, that is in directly touching contact, to a first electrode unit formed from a first active layer and a first current collector, typically in the form of a first carrier film or first current collector layer composed of an electrically conductive material. Any material should here be understood under the term "electrically conductive" that has an electrical conductivity of more than $10^5$S/m at room temperature, i.e. at 25° C.

Provision can be made that the solid electrolyte membrane and the first active layer form a laminate, that is the solid electrolyte membrane is laminated on the first active layer.

The previously described method can also be used for the production of an anode unit. In this respect, a powder mixture of an electrode material, a solid electrolyte material, an electrically conductive additive, and polytetrafluoroethylene is produced for the anode unit and at least partially fibrillated polytetrafluoroethylene is formed by the action of shear forces on the powder mixture. The powder mixture is shaped into a layer that is arranged on a current collector and that is composed of a composite material of the anode unit, with the powder mixture comprising a maximum of 1 weight percent polytetrafluoroethylene.

Provision can be made that the solid electrolyte membrane and the layer of a composite material of the anode unit that acts as a second active layer form a laminate, that is the solid electrolyte membrane is laminated on the second active layer.

An anode unit that can, for example, be produced with the described method for a lithium battery or for another solid state battery typically has an electrically conductive current collector and a layer of a composite material arranged on the current collector. The composite material has an electrode material, a solid electrolyte material, an electrically conductive additive, and polytetrafluoroethylene (PTFE') as a binding agent. The composite material has between 0.1 weight percent and 1 weight percent polytetrafluoroethylene and the polytetrafluoroethylene is at least partially present as fibrillated polytetrafluoroethylene.

By using fibrillated polytetrafluoroethylene as the binding agent, a binding agent use can be reduced so that only small amounts of polytetrafluoroethylene are necessary and the electrical properties are therefore improved. Any material should here be understood under the term "electrically conductive" that has an electrical conductivity of more than $10^6$S/m at room temperature, i.e. at 25° C. The composite material is typically solvent free to enable a simpler processing and a simpler application.

Provision can be made that the polytetrafluoroethylene in the composite material is present as an at least partially monoaxially and/or biaxially oriented polytetrafluoroethylene to set the mechanical properties as desired. Provision can naturally also be made that the polytetrafluoroethylene is present as completely monoaxially or completely biaxially oriented or aligned polytetrafluoroethylene.

The composite material can comprise the electrically conductive electrode material in a quantity of 60 weight percent to 99 weight percent, preferably to 100 percent. The composite material typically comprises at least 0.1 weight percent polytetrafluoroethylene to have sufficient binding agent available. The composite material preferably comprises less than 0.5 weight percent polytetrafluoroethylene, particularly preferably between 0.1 weight percent and 0.4 weight percent.

The electrically conductive electrode material can comprise lithium, sodium, graphite, hard carbon, that is non-graphite and/or non-graphitizable carbon material, $Li_4Ti_5O_{12}$, or a mixture of said materials.

The solid electrolyte material can comprise a material from the system $Li_2S$—$P_2S_5$, $Li_2S$—$GeS_2$, $Li_2S$—$B_2S_3$, $Li_2S$—$SiS_2$, $Li_5PS_6Cl$, $Li_2S$—$P_2S_5$—$LiX$ (X=Cl, Br, I), $Li_2S$—$P_2S_5$—$Li_2O$, $Li_2S$—$P_2S_5$—$Li_2O$—$LiI$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$P_2S_5$—$Z_mS_n$ (where m and n are whole numbers and M is selected from P, Si or Ge), $Li_2S$—$SiS_2$—$Li_3PO_4$, $Li_2S$—$SiS_2$—$Li_pMO_q$ (where p and q are whole numbers and M is selected from P, Si or Ge), $Na_2S$—$P_2S_5$, $Na_2S$—$GeS_2$, $Na_2S$—$B_2S_3$, $Na_6PS_5Cl$, $Na_2S$—$SiS_2$, $Na_2S$—$P_2S_5$—$NaX$ (X=Cl, Br, I), $Na_2S$—$P_2S_5$—$Na_2O$, $Na_2S$—$P_2S_5$—$Na_2O$—$NaI$, $Na_2S$—$SiS_2$—$NaI$, $Na_2S$—$SiS_2$—$NaBr$, $Na_2S$—$SiS_2$—$NaCl$, $Na_2S$—$SiS_2$—$B_2S_3$—$NaI$, $Na_2S$—$SiS_2$—$P_2S_5$—$NaI$, $Na_2S$—$P_2S_5$—$Z_mS_n$ (where m and n are whole numbers and M is selected from P, Si or Ge), $Na_2S$—$SiS_2$—$Na_3PO_4$, $Na_2S$—$SiS_2$—$Na_pMO_q$ (where p and q are whole numbers and M is selected from P, Si or Ge) or a mixture thereof. Lithium can generally be replaced with sodium in all the compounds named in this application. The solid electrolyte material is typically present in the powder mixture at between 13 weight percent and 35 weight percent. Carbon nanotubes, black carbons, graphite, graphene, and/or carbon fibers can be contained as conductive additives in the composite material at between 1 weight percent and 5 weight percent. The solid electrolyte material is typically an electrochemically active material. The conductive additive can be an electrochemically inactive material.

The electrode material can comprise a protective layer that is applied to particles of this material. This protective layer should prevent side reactions between the solid electrolyte material and the electrode material. The protective layer can comprise $Li_2O$—$ZrO_2$ or other metal oxides, for example. Every particle of the electrode material can have a protective layer having a thickness of typically 2-5 nm. The electrically conductive current collector of the anode unit typically comprises an electrically conductive material, preferably nickel, copper, stainless steel, or a corresponding alloy, or is completely formed from this material. Alternatively or additionally, the current collector can be formed as a current collector layer, in particular an areal current collector or a current collector film, having a preferably double-sided coating, as an expanded metal, as a foam, as a woven fabric, as a non-crimp fabric, or as a current collector layer provided with a primer layer. The primer layer can here likewise be planar.

The flexible composite layer is preferably applied to the electrically conductive current collector to form the cathode unit. Provision can also be made to subsequently compact the flexible composite layer and/or the current collector. The application of the flexible composite layer to the electrically conductive current collector layer is typically carried out at temperatures between 60° C. and 120° C., preferably 80° C. to 100° C.

A solid state battery comprises a solid electrolyte electrode composite having the described properties, wherein a second electrode unit having a second active layer and a second carrier film is applied at a surface of the solid electrolyte membrane disposed opposite the first electrode unit.

A material of the second carrier film typically differs from a material of the first carrier film.

DESCRIPTION OF THE DRAWINGS

Embodiments of the invention are shown in the drawings and will be explained in the following with reference to FIGS. 1 to 16.

DETAILED DESCRIPTION OF THE INVENTION

Figure 1:
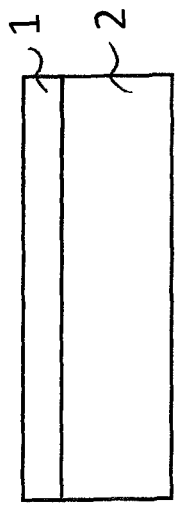
FIG. 1 a schematic lateral view of an anode.

An electrically conductive current collector layer 1 composed of aluminum as a substrate film or carrier film having a first electrode 2 as a first active layer that form a cathode unit is shown in a schematic lateral view in FIG. 1. The first electrode 2 is formed from a composite material in powder form in the embodiment shown. The composite material has 85 weight percent lithium nickel manganese cobalt (NCM), 13 weight percent a solid electrolyte material such $Li_2S$—$P2S5$ or $Li_6PS_5Cl$ (argyrodite), 2 weight percent electrically conductive carbon nanotubes as a conductive additive, and 0.1 weight percent polytetrafluoroethylene as a binder agent. The binder content here relates to the total mass with a ratio of NCM:C:SE of 85:2:13 (SE should mark the solid electrolyte as an abbreviation for it). The composite material obtained is powdery, dry, and solvent-free, but not pourable. The composite material can be blended in a mortar. Shear forces are exerted on the mixture forming the composite material or on the powder mixture in this process that effect a fibril formation along the force vector. In a following step, the composite material is rolled on a plate to a desired layer thickness using a roller and is laminated onto the carrier film 1. The carrier film 1 has a thickness of less than 20 μm and may be provided with a carbon primer. A final shaping of the cathode unit takes place by stamping or laser cutting.

The composite material can alternatively be added directly into a calendar gap as a powder mixture or a bulk material without solvent additives. As described in German patent application DE 10 2017 208 220, different rotational speeds of the two calendar rollers are used, for example in a ratio of 10:9 to 10:4. A ratio of the rotational speeds of 21: e.g. 10 mm/s:5 mm/s or 20 mm/s to 10 mm/s is advantageous. A shear force is hereby exerted on the composite material in the gap that effects a fibril formation along the roller running direction. A layer formation is produced on the roller rotating faster. In a following step, the layer is laminated onto the substrate film 1 and a final shaping takes place by stamping or laser cutting. The formation of a film in the calendar gap moreover already enables a great compacting of the involved layers during the film formation. What is important for this is particle size distributions of the powdery materials that are used for the composite material that are coordinated with one another to fill gaps of the large particles with smaller particles as efficiently as possible and to keep porosity low. The film therefore has a density prior to pressing of 1.7-1.9 g/cm$^3$, which corresponds to a porosity of 50 to 55 percent. After the pressing or compacting, the density is 3.5 g/cm$^3$ as a rule and the porosity at a value of up to 10 percent approaches the ideal value of 0 percent porosity.

A processing takes place in an advantageous manner at elevated temperatures between 60° C. and 100° C., which has the consequence of a considerable reduction of the required binder agent content or binder content. In addition, the solid state electrolyte can thus also be processed at higher temperatures without bonding. The cathode unit hereby obtained thus has the layer sequence of substrate film 1-first electrode 2. The first electrode 2 typically has a structure as follows in its composition: Cathode material: 60 to 99 weight percent, solid electrolyte material 13 to 35 weight percent, conductive additive 2 to 5 weight percent, where the binding agent (polytetrafluoroethylene) makes up 0.1 to 1 weight percent of the total mass. The already mentioned pressing is typically finally carried out as a process step. This is done at a pressure of 290 MPa to 450 MPa, preferably 300 MPa, to ensure a flow capability of the electrolyte. All the processing steps in which the solid electrolyte material is involved preferably take place under protective gas, for example a noble gas, preferably argon, or nitrogen, or dry air having a dew point below −50° C.

An anode unit can also be produced by the described method instead of a cathode unit. A powder mixture is used and is processed as described for this purpose composed of, for example, 60 weight percent to 85 weight percent graphite, 13 weight percent to 35 weight percent solid electrolyte, and 2 weight percent to 5 weight percent carbon nanotubes. Nickel or stainless steel film or copper is used as the substrate or current collector layer 1. Polytetrafluoroethylene is added to the powder mixture at 0.3 weight percent to 1 weight percent of the total mass. Hard carbon, lithium, a lithium alloy, in particular a lithium indium alloy, or silicon can also be used for the anode instead of graphite.

Figure 2:
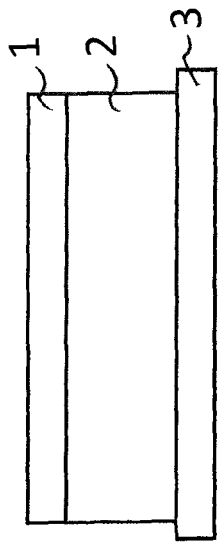
FIG. 2 the anode having a solid electrolyte membrane in a representation corresponding to FIG. 1.

The cathode unit of carrier film 1 and first electrode 2 is shown in FIG. 2 in a view corresponding to FIG. 1, with now a solid electrolyte membrane 3 being arranged in direct contact, that is in immediately touching contact, at a side or surface opposite the side or surface of the first electrode 2 to which the carrier film 1 is attached in direct contact as a current collector layer. While the carrier film 1 and the first electrode 2 are disposed in alignment above one another, that is have identical dimensions except for their respective thicknesses, the solid electrolyte membrane 3 is wider than the first electrode 2. Repeating elements are provided with identical reference numerals in this Figure and also in the following Figures.

Figure 3:
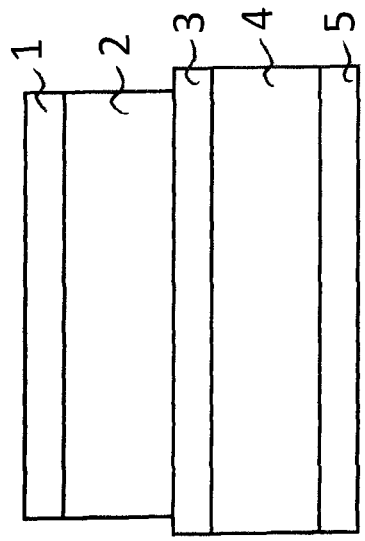
FIG. 3 the anode provided with the solid electrolyte membrane and a cathode in a representation corresponding to FIG. 1.

FIG. 3 shows in a view corresponding to FIGS. 1 and 2 a solid state battery in which, in addition to the structure shown in FIG. 2, an anode unit is attached to a side disposed opposite a side of the solid electrolyte membrane 3. The anode unit is formed from a second electrode 4 as a second active layer and from a second substrate film 5 as a second current collector layer that are in turn in direct contact with one another. The second electrode 4 is in direct contact with the solid electrolyte membrane 3. The solid electrolyte membrane 3, the second electrode 4, and the second carrier film 5 are arranged in alignment above one another, with the second carrier film 5 having the smallest thickness, the second electrode 4 having the largest thickness, and the thickness of the solid electrolyte membrane 3 being between the thickness of the second electrode 4 and the second carrier film 5. The capacitances are typically coordinated with one another, from which the thicknesses result. The first electrode can, for example, have a thickness of 100 μm, the second electrode as the lithium anode, for example, up to 10 μm. The thicknesses of the first carrier film 1 and of the second carrier film 5 can also be identical. The thickness of the first electrode 2 is greater than the thickness of the solid electrolyte membrane 3 that in turn has a greater thickness than the first carrier film 1. Battery electrodes for primary and secondary batteries can be produced with the described method, preferably with a lithium ion compound or a sodium ion compound, solid state supercapacitor electrodes, or layers of moisture-sensitive or solvent-sensitive materials, that is sulfide electrolytes of all kinds.

The solid electrolyte membrane 3 is here likewise formed by the described method. A powder mixture of more than 99.9 weight percent solid electrolyte and 0.1 weight percent polytetrafluoroethylene is processed up to the creation of a film in an analog manner to the cathode production. This results in a solid electrolyte film having the following properties: 99 weight percent to 99.9 weight percent solid electrolyte and 0.1 weight percent to 1 weight percent polytetrafluoroethylene.

The cell stack shown in a schematic side view in FIG. 3 can be provided with a battery housing configured as a pouch bag or as a hard case. The stack is subsequently compacted and tensioned so that a solid state battery is obtained. It is thus possible to build up all the layers of the solid state battery with the same binder and to laminate them directly onto one another or to connect them in a different manner. Homogeneous and compact boundary surfaces can hereby be obtained that do not impair battery performance. It is nevertheless possible to combine the components with components produced in a different manner.

The described method permits an electrode production without the addition of solvents. Since a solid state battery is mechanically tensioned, greatly ultimately, for its operation, the binder function is only required for the film formation, but not for the stabilization of the layers in the operation of the completed cell.

Figure 4:
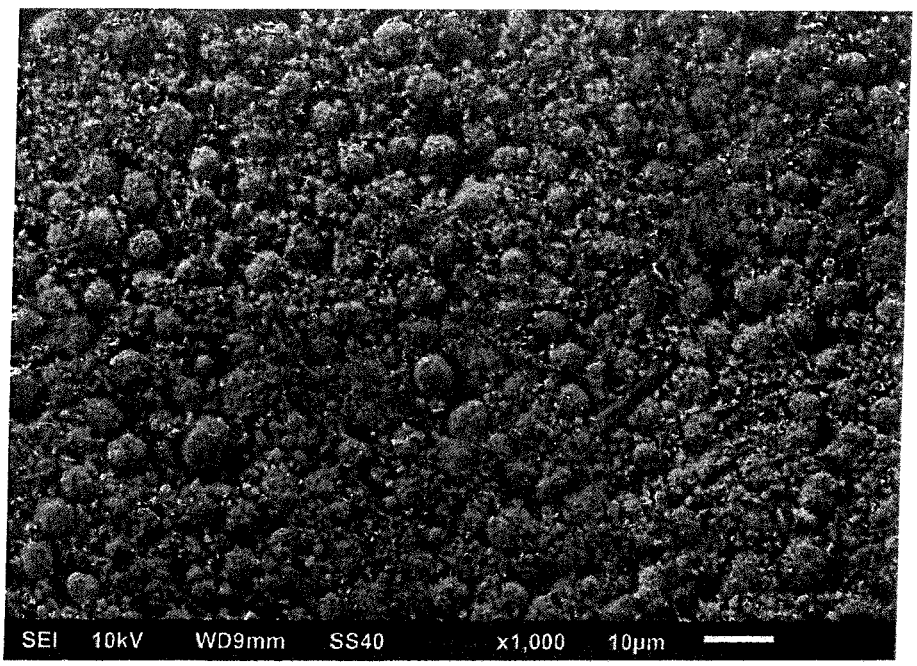
FIG. 4 a scanning electron microscope photograph of a dry film of a composite material.

FIG. 4 shows a scanning electron microscope photograph (SEM photograph) of a dry film composed of NCM, solid electrolyte (SE), carbon fibers (CNF) in a mass ratio of 85:13:2 and 0.3 weight percent of the total mass of polytetrafluoroethylene (PTFE).

Figure 5:
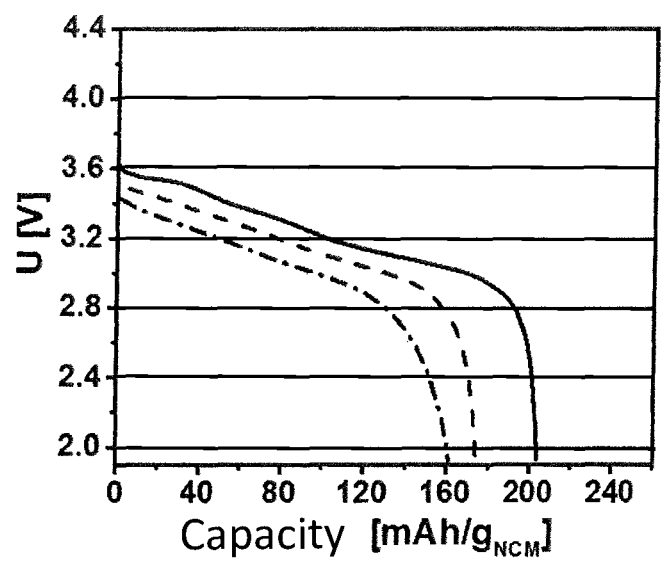
FIG. 5 a discharge voltage profile of a test cell having a binder content of 0 weight percent.
Figure 6:
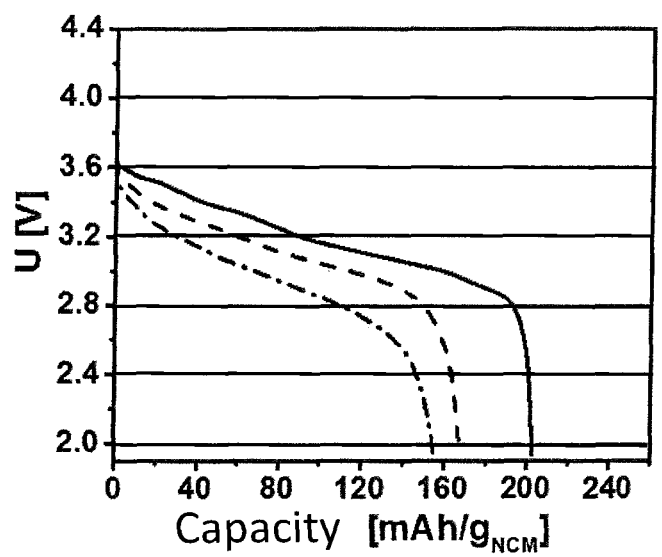
FIG. 6 the discharge voltage profile of the test cell having a binder content of 0.1 weight percent in a representation corresponding to FIG. 5.
Figure 7:
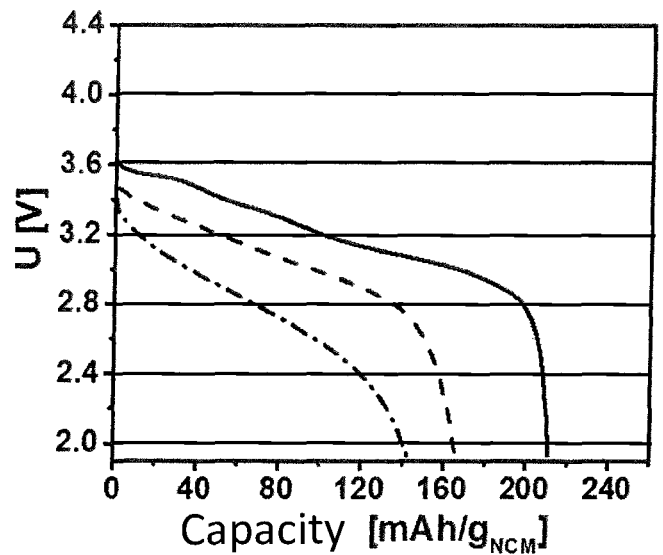
FIG. 7 the discharge voltage profile of the test cell having a binder content of 0.3 weight percent in a representation corresponding to FIG. 5.
Figure 8:
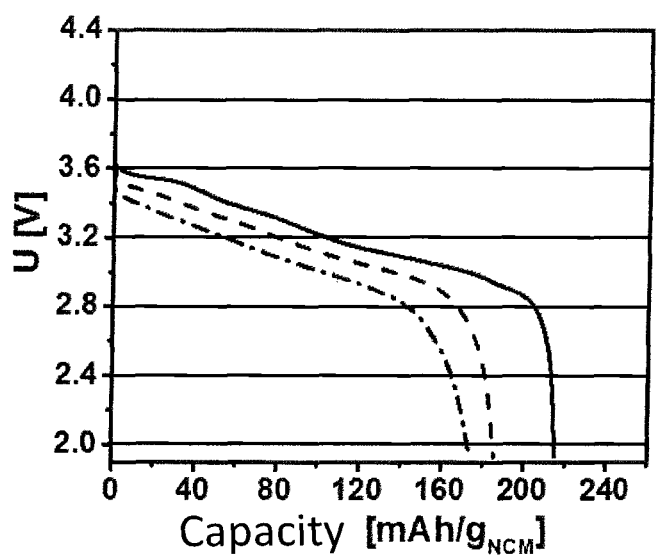
FIG. 8 the discharge voltage profile of the test cell having a binder content of 0.7 weight percent in a representation corresponding to FIG. 5.
Figure 9:
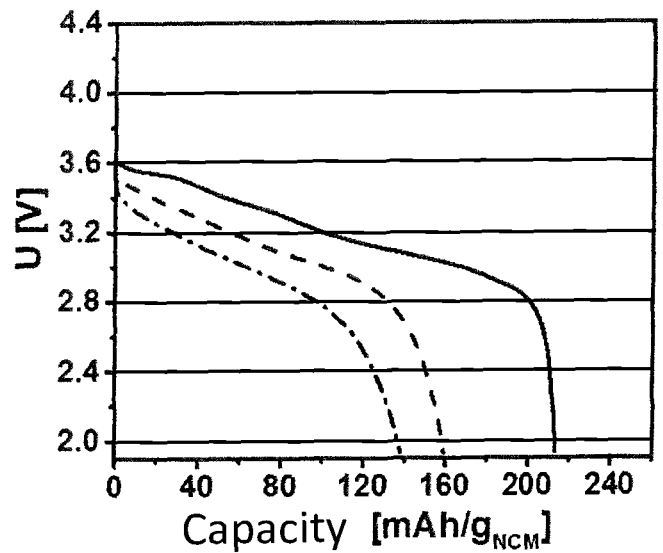
FIG. 9 the discharge voltage profile of the test cell having a binder content of 1 weight percent in a representation corresponding to FIG. 5.

Respective discharge voltage profiles of test cells of the described solid state battery are shown in FIGS. 5 to 9. A respective electrical voltage is entered over the capacitance here. In FIG. 5, the proportion of polytetrafluoroethylene amounts to 0 weight percent; in FIG. 6, 0.1 weight percent; in FIG. 7, 0.3 weight percent; in FIG. 8, 0.7 weight percent; and in FIG. 10, 1 weight percent.

Figure 10:
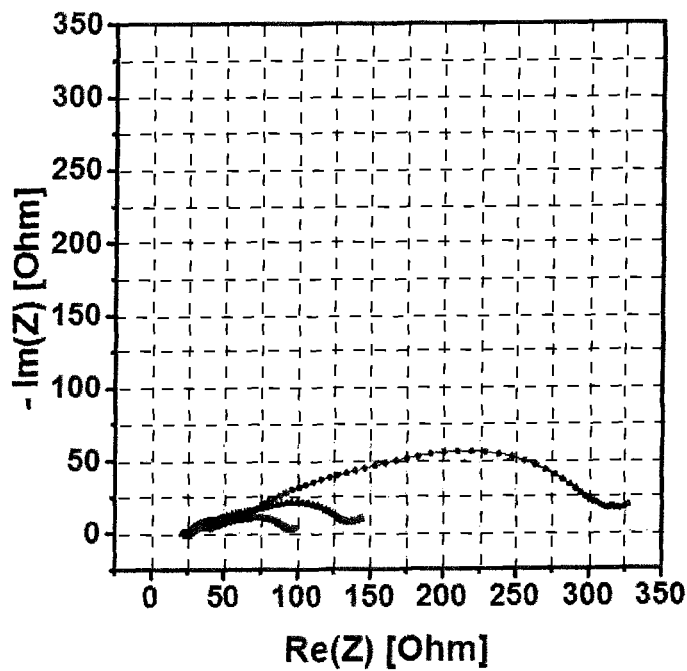
FIG. 10 a Nyquist diagram of the internal resistance of the test cell.

In FIG. 10, an impedance measurement in which an imaginary portion is entered over a real portion is shown in a Nyquist diagram. The measurement curves show a test cell having a binder portion of 0.1 weight percent, 0.3 weight percent, and 1 weight percent. The internal resistance of the respective solid state battery increases as the proportion of polytetrafluoroethylene increases.

Figure 11:
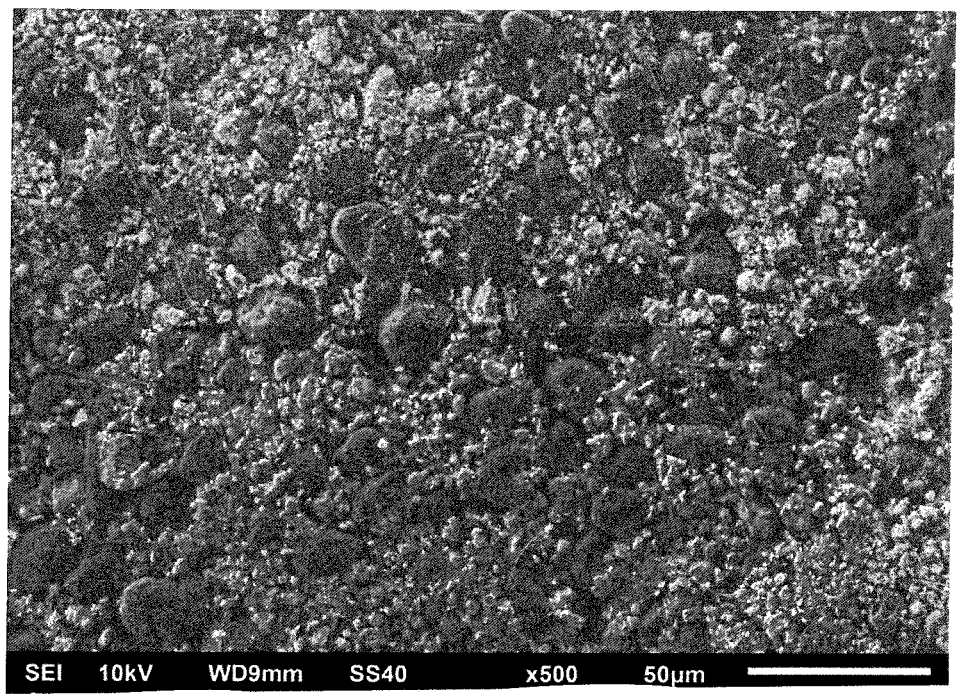
FIG. 11 a scanning electron microscope photograph, corresponding to FIG. 4, of an anode containing graphite.
Figure 12:
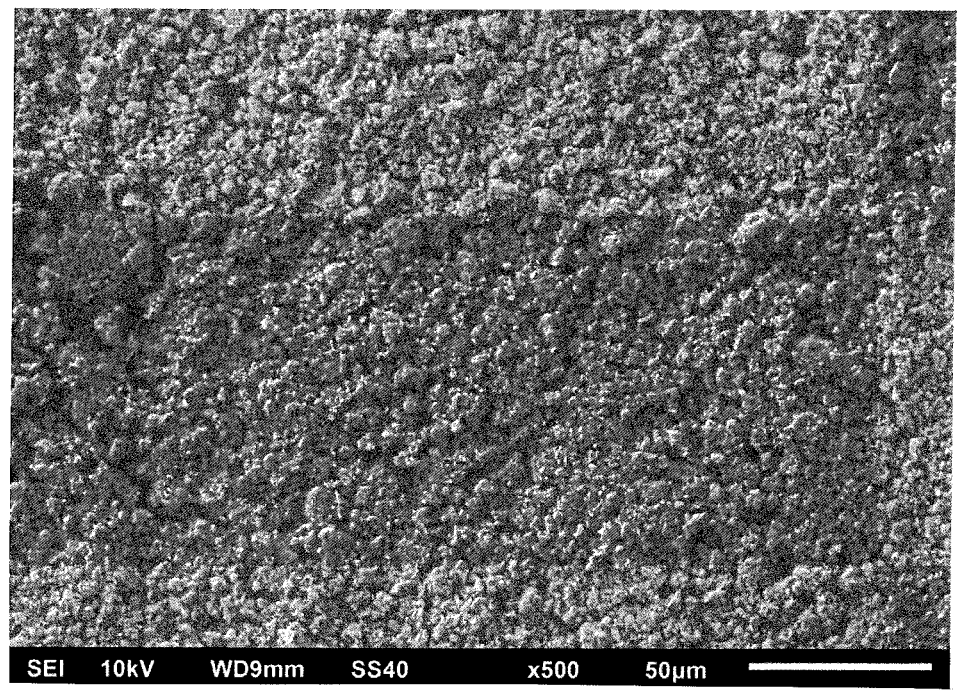
FIG. 12 a scanning electron microscope photograph, corresponding to FIG. 4, of a solid electrolyte membrane.

Scanning electron microscope photographs are in turn shown in FIGS. 11 and 12 corresponding to FIG. 4. FIG. 11 shows the second electrode 4 of the anode unit that was produced from graphite, solid electrolyte material, and 0.7 weight percent polytetrafluoroethylene. The solid electrolyte membrane 3 composed of a solid electrolyte material and 0.7 weight percent polytetrafluoroethylene is shown in FIG. 12.

Figure 13:
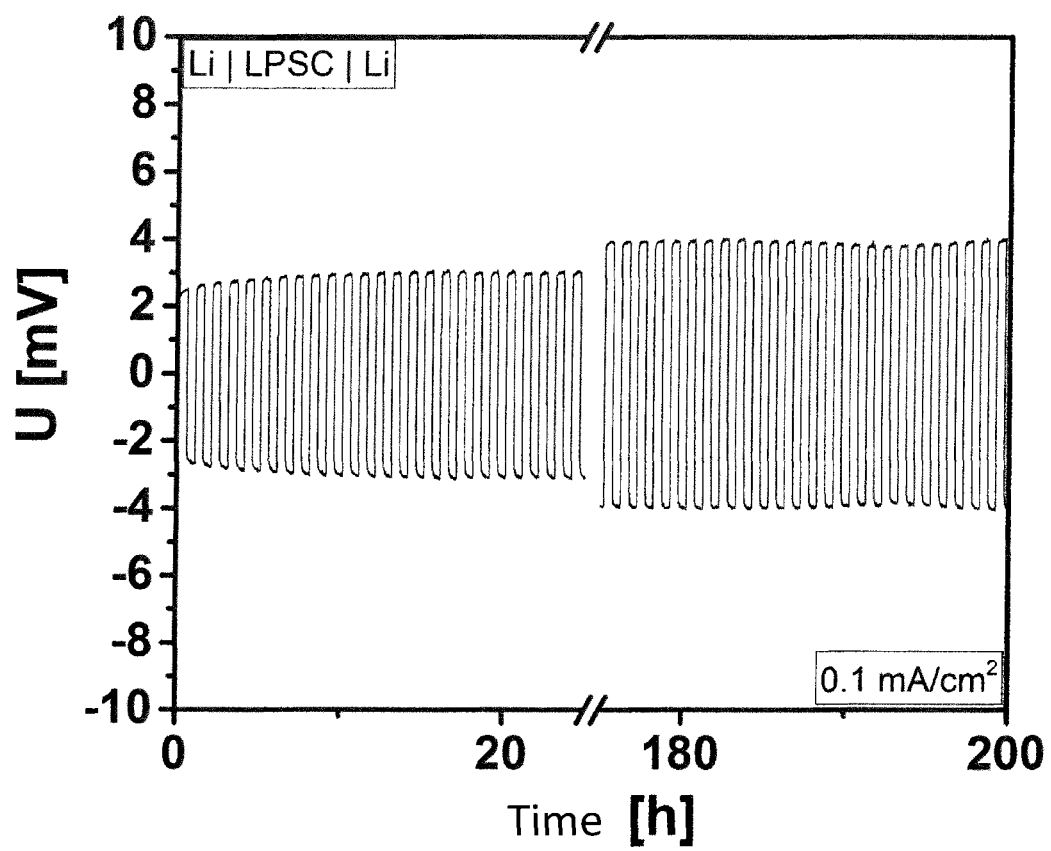
FIG. 13 a diagram of a voltage progression over time of a battery cell of a symmetrical design.

A diagram of an electrical voltage progression of a symmetrical battery cell is shown in FIG. 13. The symmetrical battery cell, that comprises two lithium anodes and a membrane of solid electrolyte material, was charged and discharged over a time of 200 hours at a current density of 0.1 mA/cm$^2$ for 30 minutes in each case, that is was galvanostatically cycled. The voltage progression entered over the time shows that the overvoltage remains stable during the measurement.

Figure 14:
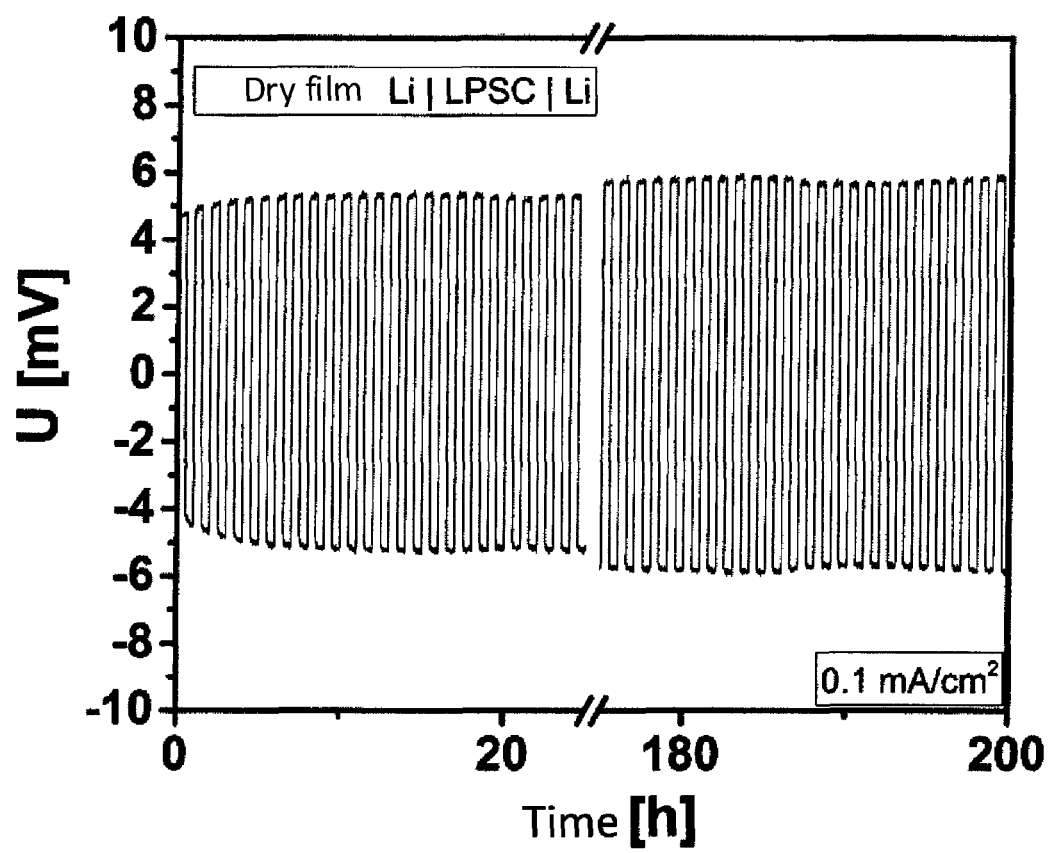
FIG. 14 a representation of the voltage progression of a symmetrical battery cell provided with polytetrafluoroethylene as a binder corresponding to FIG. 13.

The voltage progression for a battery cell comprising 0.7 weight percent polytetrafluoroethylene in the membrane of solid electrolyte dry film is shown in FIG. 14 in a representation corresponding to FIG. 13. The measurement cycle corresponds to the measurement cycle described in connection with FIG. 13 and the overvoltage again remains stable during the measurement. It can be concluded that side reactions of the binder can be neglected.

Figure 15:
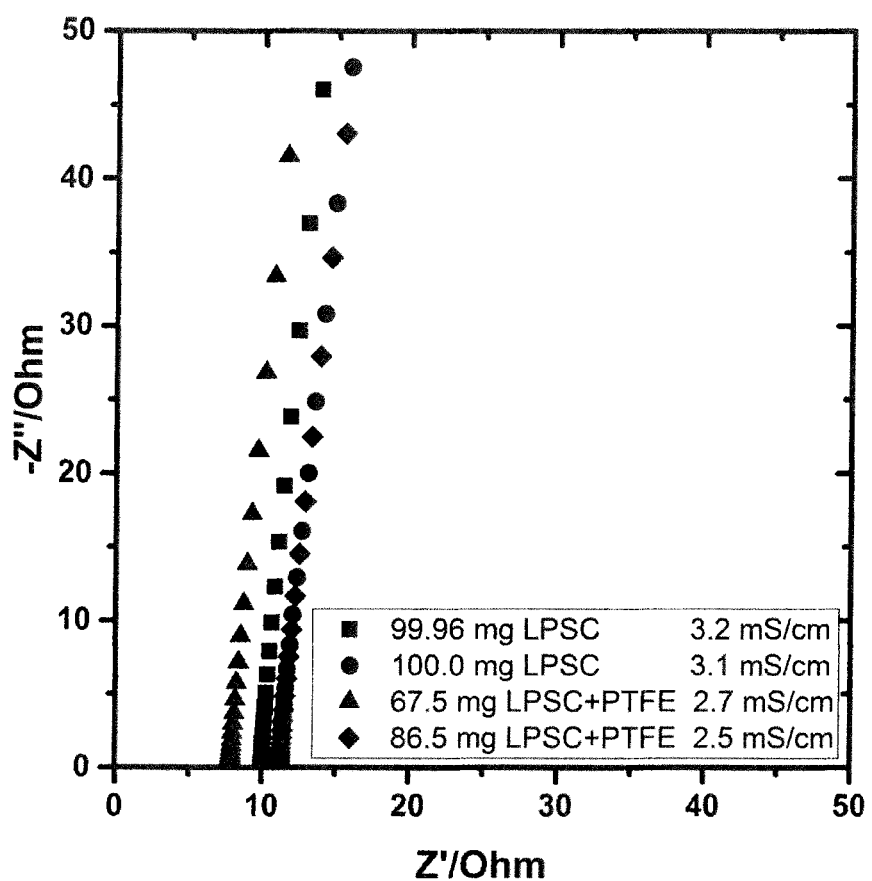
FIG. 15 impedance spectra of a solid electrolyte material.

FIG. 15 shows impedance spectra for the electrical conductivity determination of the solid electrolyte material or of the solid electrolyte at room temperature. The electrical conductivity of the solid electrolyte membrane 3 is only marginally degraded due to the small binder weight of 0.7 weight percent. Wet chemical approaches reduce the electrical conductivity by up to a factor of 10 in part.

Figure 16:
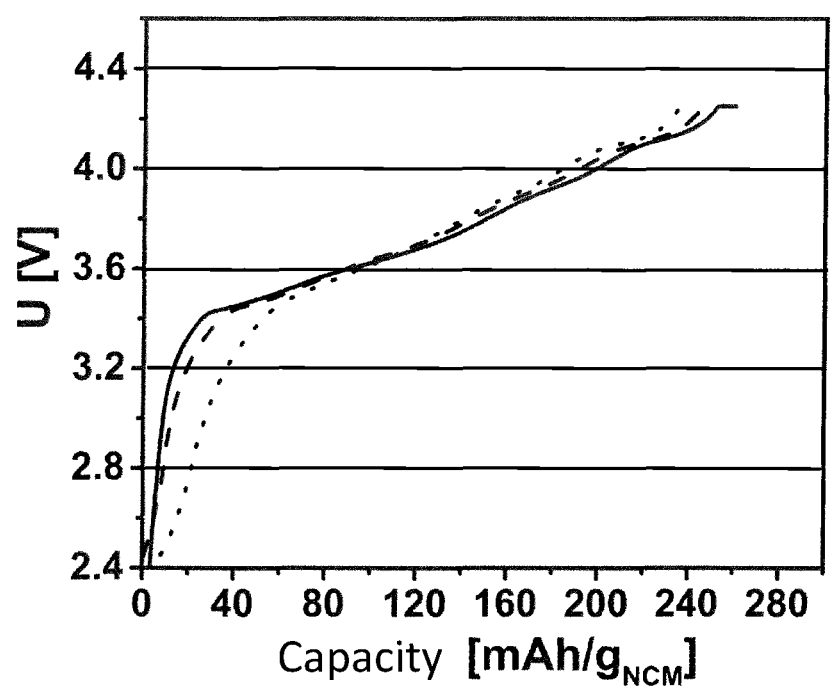
FIG. 16 a voltage curve of a first charging section of a graphite dry film electrode in combination with an electrolyte dry film and a cathode dry film.

FIG. 16 shows a voltage progression of a first charging section of a graphite dry film electrode in combination with an electrolyte dry film as the solid electrolyte membrane 3. The continuous measurement curve relates to a binder portion of 0 weight percent used in all; the dashed curve to a binder portion of 0.3 weight percent polytetrafluoroethylene; and the dotted measurement curve to a binder portion of 0.7 weight percent polytetrafluoroethylene. The irreversible capacity with a smaller binder content drops below 3.4 V. Conversely to this, more capacity can be stored up to a breakdown voltage of 4.25 V.

Only embodiments disclosed in the embodiment examples can be combined with one another and are claimed individually.

The invention claimed is:

1. A method of producing a solid electrolyte membrane or an anode unit for a solid state battery,
producing a powder mixture of a solid electrolyte membrane and polytetrafluoroethylene for the solid electrolyte membrane, or producing a powder mixture of an electrode material, a solid electrolyte material, an electrically conductive additive, and polytetrafluoroethylene for the anode unit;
forming at least partially fibrillated polytetrafluoroethylene by the effect of shear forces on the powder mixture;
shaping the powder mixture into a flexible composite layer as the solid electrolyte membrane or into a layer arranged on a current collector layer and composed of a composite material of the anode unit; wherein
the powder mixture has a maximum of 1 weight percent polytetrafluoroethylene.

2. The method in accordance with claim 1, wherein the at least partially fibrillated polytetrafluoroethylene is formed by grinding, mixing in a worm shaft or mixing in a calender roll device, or a combination thereof.

3. The method in accordance with claim 1, wherein the powder mixture is shaped into the flexible composite layer by rolling, pressing, or extrusion.

4. The method in accordance with claim 1, wherein the powder mixture for the solid electrolyte membrane comprises the solid electrolyte material in a concentration of 99 weight percent to 99.9 weight percent and the polytetrafluoroethylene in a concentration of 0.1 weight percent to 1 weight percent.

5. The method in accordance with claim 1, wherein the polytetrafluoroethylene is present as a completely monoaxially or completely biaxially oriented polytetrafluoroethylene.

6. A solid electrolyte membrane comprising a solid electrolyte material and polytetrafluoroethylene, wherein the solid electrolyte membrane comprises a maximum of 1 weight percent polytetrafluoroethylene.

7. An anode unit having an electrically conductive current collector layer and a layer arranged on the current collector layer and composed of a composite material that has an electrode material, a solid electrolyte material, an electrically conductive additive, and polytetrafluoroethylene as a binding agent, wherein the composite material comprises a maximum of 1 weight percent polytetrafluoroethylene and the polytetrafluoroethylene is at least partially present as fibrillated polytetrafluoroethylene.

8. The anode unit in accordance with claim 7, wherein the composite material comprises at least 0.1 weight percent polytetrafluoroethylene.

9. The anode unit in accordance with claim 7, wherein the electrode material comprises a protective layer applied to particles of the electrode material.

10. A solid electrolyte electrode composite in which the solid electrolyte membrane in accordance with claim 6 is applied directly onto a first electrode unit formed from a first active layer and a first carrier film.

11. The solid electrolyte electrode composite in accordance with claim 10, wherein the solid electrolyte membrane and the first active layer form a laminate.

12. A solid state battery having a solid electrolyte electrode composite in accordance with claim 10, wherein an anode unit is applied to a surface of the solid electrolyte membrane disposed opposite the first electrode unit with a current collector layer as a second carrier film and a layer of a composite material as a second active layer.

13. The solid state battery in accordance with claim 12, wherein a material of the second carrier film differs from a material of the first carrier film.

* * * * *